(12) United States Patent
Bonn

(10) Patent No.: US 12,098,794 B2
(45) Date of Patent: Sep. 24, 2024

(54) CRYOGENIC ROTATING SEAL

(71) Applicant: VJ Systems, LLC, Hilliard, OH (US)

(72) Inventor: John W. Bonn, Hilliard, OH (US)

(73) Assignee: VJ Systems, LLC, Hilliard, OH (US)

(*) Notice: Subject to any disclaimer, the term of this patent is extended or adjusted under 35 U.S.C. 154(b) by 0 days.

(21) Appl. No.: 18/585,757

(22) Filed: Feb. 23, 2024

(65) Prior Publication Data
US 2024/0288109 A1    Aug. 29, 2024

Related U.S. Application Data

(60) Provisional application No. 63/486,915, filed on Feb. 24, 2023.

(51) Int. Cl.
*F16L 37/53* (2006.01)
*F16L 37/248* (2006.01)

(52) U.S. Cl.
CPC ............ *F16L 37/53* (2013.01); *F16L 37/248* (2013.01)

(58) Field of Classification Search
CPC ......... F16L 37/22; F16L 37/53; F16L 37/248; F16L 27/0828; F16L 27/0816; F16L 27/0824; F16L 59/06; F16L 59/065
USPC ........................................................ 285/904
See application file for complete search history.

(56) References Cited

U.S. PATENT DOCUMENTS

| | | | | |
|---|---|---|---|---|
| 3,408,095 A * | 10/1968 | Moore | ............. | F16L 27/0828 285/276 |
| 3,679,235 A * | 7/1972 | Faccou | ............. | F16L 27/0828 285/47 |
| 3,823,569 A * | 7/1974 | Sellmaier | ............. | F16L 59/185 62/50.7 |
| 3,843,171 A * | 10/1974 | Hewlett | ............. | F16L 59/185 285/121.6 |
| 4,018,059 A * | 4/1977 | Hatch | ............. | F16L 59/185 62/505 |
| 4,139,220 A * | 2/1979 | Faccou | ............. | F16L 27/0828 285/47 |
| 6,134,893 A | 10/2000 | Bonn | | |
| 7,399,002 B2 | 7/2008 | Motew et al. | | |
| 8,616,587 B2 * | 12/2013 | Izumi | ............. | F16L 59/185 285/275 |
| 10,591,105 B2 * | 3/2020 | Takami | ............. | F16L 59/065 |

FOREIGN PATENT DOCUMENTS

JP    2019120286 A * 7/2019 ............. B67D 9/02

* cited by examiner

*Primary Examiner* — David Bochna
(74) *Attorney, Agent, or Firm* — Thomas E. Lees, LLC

(57) ABSTRACT

A swivel bayonet joint for transferring cryogenic fluids includes a plug bayonet joint and a socket bayonet joint. The plug bayonet joint has an insertion stem with an insertion jacket surrounding and co-axial with a plug inner line of a corresponding pipe section, and a first clamp member having at least one race. The socket bayonet joint has a vacuum jacket at a distal end thereof that sleeves over the insertion stem of the plug bayonet joint, and a second clamp member having at least one race. When the plug bayonet joint is mated with the socket bayonet joint, the race of the plug bayonet joint aligns with the race of the socket bayonet joint to define a clamp member that is filled with ball bearings, the ball bearings functioning to lock the plug bayonet joint to the socket bayonet joint so as to allow rotation therebetween.

19 Claims, 14 Drawing Sheets

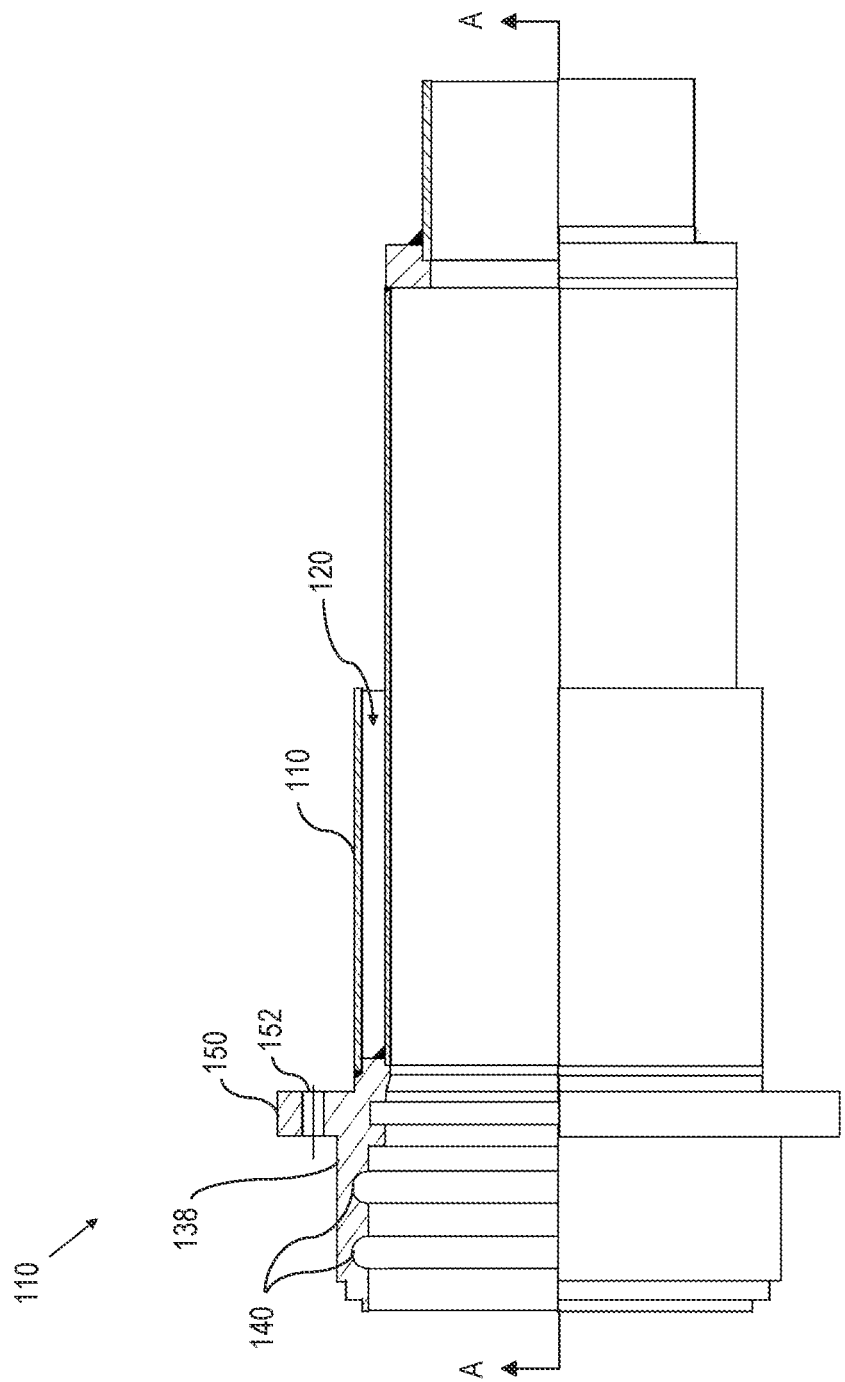

CRYOGENIC ROTATING SEAL

CROSS REFERENCE TO RELATED APPLICATIONS

This application claims the benefit of U.S. Provisional Patent Application Ser. No. 63/486,915, filed Feb. 24, 2023, entitled "CRYOGENIC ROTATING SEAL", the disclosure of which is hereby incorporated by reference.

BACKGROUND

1. Field of the Invention

Various aspects of the present disclosure relate generally to seals, expansion joints, interconnects, etc., for piping, and more particularly, to cryogenic rotating seals including seals for vacuum-insulated pipe expansion bellows. Aspects further relate to a cryogenic fluid dispensing system for transferring cryogenic fluid through fixed and/or flexible cryogenic pipes.

2. Description of Related Art

Thermally insulated pipes have a wide variety of industrial applications. For example, insulated piping can be used to transport cryogenic liquids between storage tanks or between a storage tank and a use device. Due to the length, complexity, and customized routing of typical piping systems, manufacturers often provide prefabricated insulated pipe sections that are to be connected with joints. However, such joints provide opportunity for leakage, including thermal leakage.

BRIEF SUMMARY

According to aspects of the present invention, a swivel bayonet joint for transferring cryogenic fluids comprises a plug bayonet joint and a socket bayonet joint. The plug bayonet joint comprises an insertion stem having an insertion jacket surrounding and co-axial with a plug inner line of a corresponding pipe section, and a first clamp member having at least one race (e.g., an inner race). The socket bayonet joint comprises a vacuum jacket at a distal end thereof that sleeves over the insertion stem of the plug bayonet joint, and a second clamp member having at least one race (e.g., an outer race). When the plug bayonet joint is mated with the socket bayonet joint, the race of the first clamp member aligns with the race of the second clamp member to define a clamp having a bearing aperture. As such, when ball bearings fill the bearing aperture, the ball bearings function to lock the plug bayonet joint to the socket bayonet joint so as to allow rotation therebetween.

In some embodiments, the plug bayonet joint further comprises a first support strut that supports a pipe jacket co-axial with the plug inner line, such that the swivel bayonet joint restricts heat input into a cryogenic process fluid carried through the swivel bayonet joint, and maintains mechanical components of the swivel bayonet joint at ambient temperatures while cryogenic process fluid passes through the swivel bayonet joint.

In some embodiments, all welding and stress relieving is completed before machining and no welding is required after machining that could cause distortion to occur to the high tolerances of the swivel joint bayonet assembly between the plug and socket bayonet.

BRIEF DESCRIPTION OF THE SEVERAL VIEWS OF THE DRAWINGS

FIG. 1C is an illustration of a socket component of the example swivel bayonet joint of FIG. 1A according to aspects of the present disclosure;

DETAILED DESCRIPTION

Figure 1A:
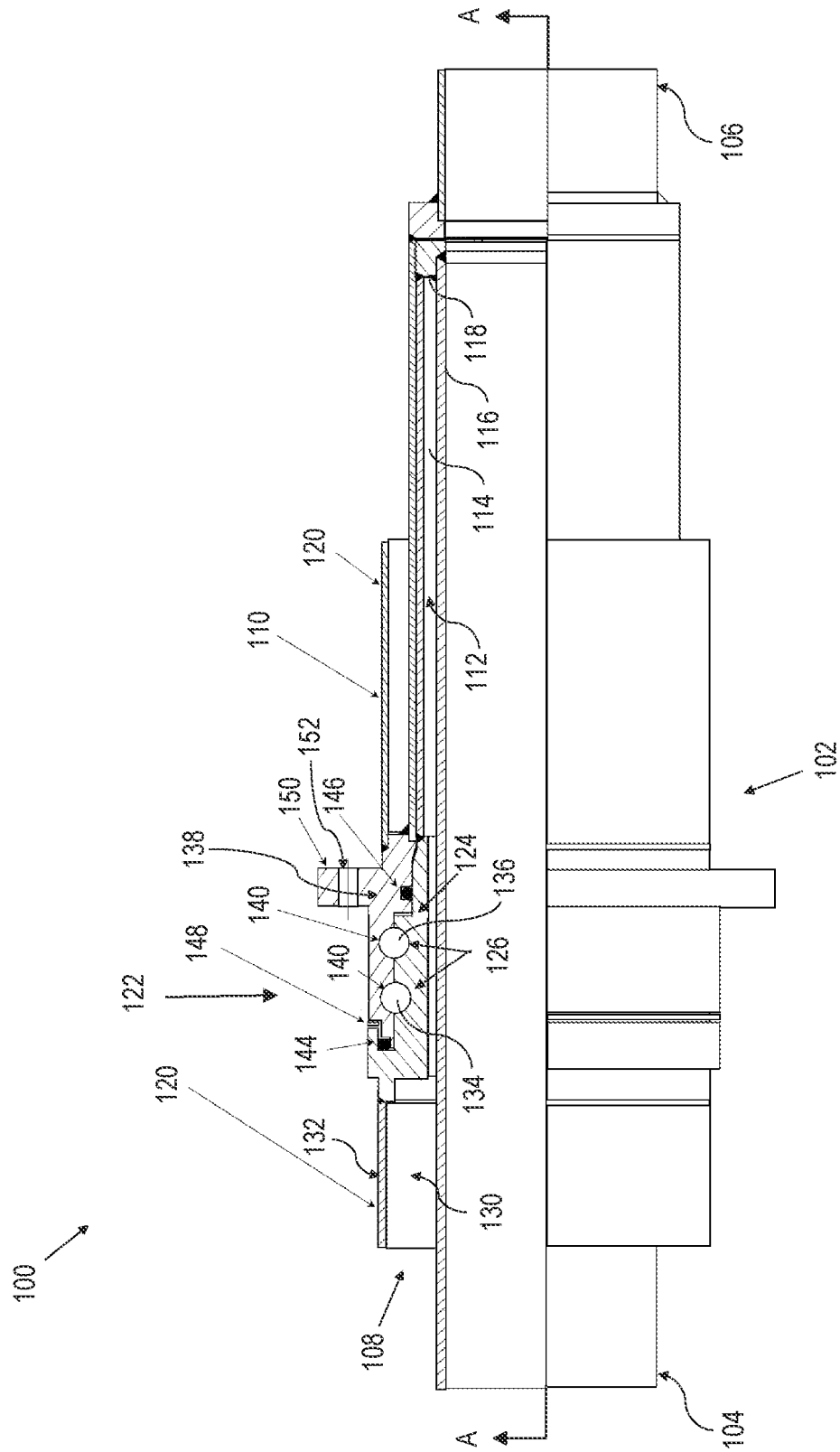
FIG. 1A is an illustration of an example swivel bayonet joint with a first flange mount configuration according to aspects of the present disclosure.

Various aspects of the present disclosure relate generally to seals, expansion joints, interconnects, etc., for piping. More particularly, aspects herein relate to cryogenic rotating seals including seals for vacuum-insulated pipe expansion bellows useful with prefabricated pipe sections. One type of prefabricated pipe features vacuum-insulated sections. This pipe section is constructed of an inner pipe surrounded by an outer pipe. The inner pipe and outer pipe are concentrically positioned so that an annular insulation space is formed therebetween. The ends of the outer pipe are welded to the inner pipe so that the annular space is sealed. Either the inner pipe or the outer pipe is provided with a bellows so that the integrity of the welds is preserved when the pipes expand or contract by differing amounts due to temperature changes.

In some prefabricated pipe sections, the annular insulation space between the inner pipe and outer pipe is evacuated and filled insulation, e.g., with layers of thin fabric formed of fine fibers of glass, cellulose or other fibrous material characterized by low heat conductivity. For instance, reflective barrier sheets can be positioned between the thin fabric layers, which are formed of highly reflective material, such as an aluminum foil. When utilized in cryogenic liquid applications, the insulation arrangement reduces conduction and radiation heat gain to the cryogen within the inner pipes.

However, with currently available vacuum-insulated piping, a failure of the bellows of the piping can cause cryogenic material to leak from within the inside pipe into the annular insulation space between the inner pipe and the outer pipe (e.g., within a vacuum region). When this occurs, vaporization of the leaked liquid cryogenic material and the cooling effects of the cryogenic material on the outer pipe can create a situation where other parts of a corresponding piping system may fail catastrophically. In this regard, the joints between two pipe sections create opportunities for leaks and failures of the piping system.

However, according to aspects herein, a cryogenic rotating seal is provided for pipes, including for vacuum-insulated pipes, that eliminates or minimizes such leakage, by providing a bayonet connector as described more fully herein.

Some embodiments herein are particularly well suited for pipes of relatively larger diameter, e.g., pipes used for fueling of rockets and other devices. By way of example, cryogenic pipe couplers are typically designed to fix pipe end sections together such that the joined sections of cryogenic pipe cannot rotate or swivel relative to each other. However, to dispense fuel to a vehicle such as a rocket, a cryogenic fuel dispensing arm must be able to readily extend from a pump control housing to a dispensing position having a discharge outlet adjacent the vehicle and then move safely back to the control housing into a stored position. In order for such a cryogenic fuel dispensing arm to perform such a task, the dispensing arm must include one or more joints that permit swiveling of pipe sections relative to each other.

Here, typical components such as bearing races, seals (e.g., elastomeric seals) etc., could become brittle and could fail due to the temperatures associated with cryogenic fluids. Moreover, common bearing lubricants could not be used. It is also possible that rapid temperature fluctuations of joint components (e.g., metal mechanical components) could cause contraction, cracking, and subsequent leakage when the components transition from ambient temperatures to extremely cold temperatures.

However, the swivel joint herein is able to both effectively restrict heat input into the fluid and also maintain mechanical components of the joint at ambient temperatures while a cryogenic process fluid passes through the joint. For instance, hardware components of the swivel bayonet joint can remain at ambient temperatures while a cryogenic fluid passes through the joint. Moreover, the swivel bayonet joint can be readily assembled in a field environment.

The FIGURES show embodiments illustrated in partial cross-sectional view as split along cross-sectional line A-A. The details shown above the cross-section line are mirrored below the cross-section line A-A and are thus not illustrated, unless otherwise noted. That is, since there is symmetry, only a partial cutaway is shown for clarity of illustration. Moreover, many FIGURES illustrate the system as shown in an assembled state with a plug bayonet joint coupled to a socket bayonet joint. However, in some embodiments, the plug bayonet joint can be decoupled from the socket bayonet joint, e.g., to facilitate field assembly.

First Example Swivel Bayonet

Figure 1B:
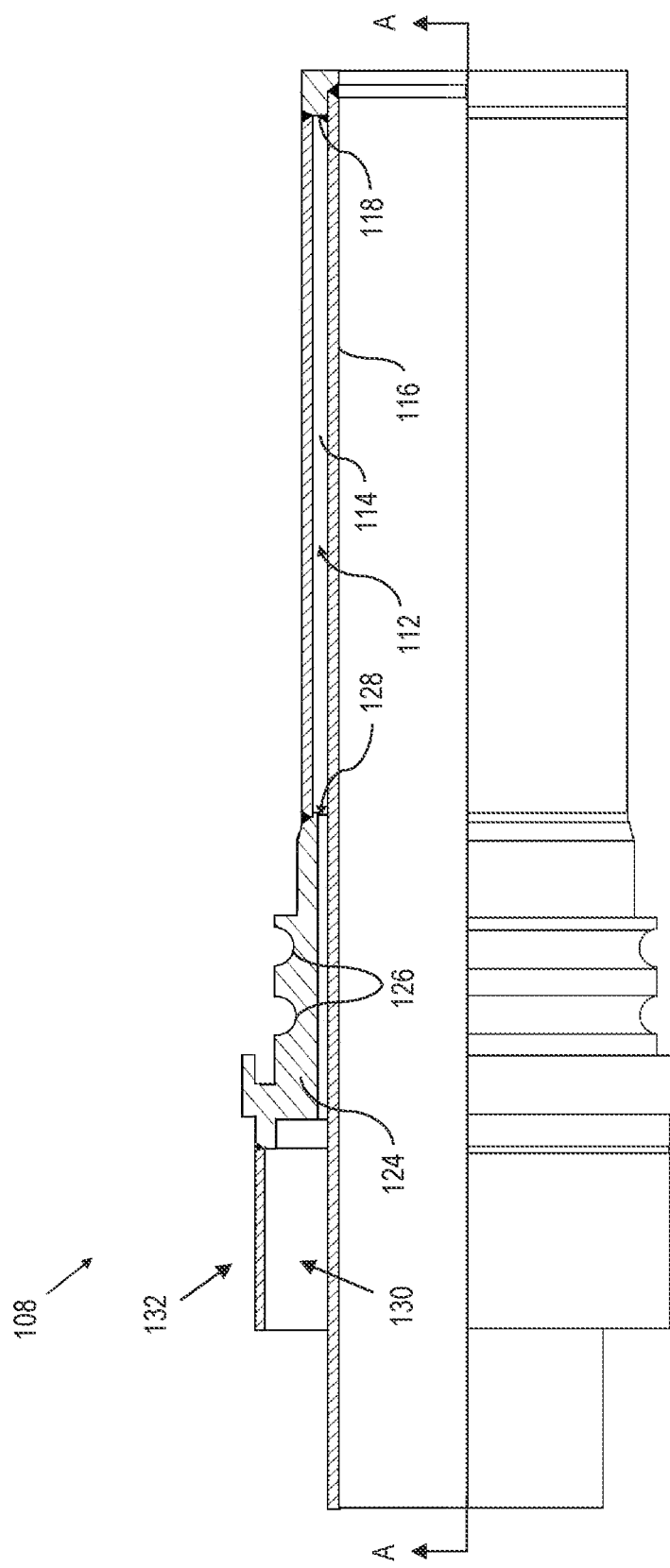
FIG. 1B is an illustration of a plug component of the example swivel bayonet joint of FIG. 1A according to aspects of the present disclosure.

Referring now to the drawings, and in particular, to FIG. 1A FIG. 1B, and FIG. 1C, an example swivel bayonet joint system 100 is illustrated. FIG. 1A illustrates the swivel bayonet joint system in an assembled state, which is comprised of a plug bayonet section and a socket bayonet section. FIG. 1B illustrates the plug bayonet section, and FIG. 1C illustrates the socket bayonet section.

As will be described in greater detail herein, embodiments herein can vary based upon a mount provided with the swivel bayonet joint system 100.

Generally, the swivel bayonet joint system 100 includes a mechanical, swivel bayonet joint 102 that couples a first pipe section 104 to a second pipe section 106 in a manner that allows the first pipe section 104 to swivel relative to the second pipe section 106.

To this end, the swivel bayonet joint 102 includes a plug bayonet joint 108 that is fixed to an end of the first pipe section 104. The swivel bayonet joint 102 also includes a socket bayonet joint 110 that is fixed to a corresponding end of the second pipe section 106.

In some embodiments, the swivel bayonet joint 102 can be dismantled and assembled easily in the field. For instance, as will be described in greater detail herein, the swivel bayonet joint 102 can be assembled by coupling the plug bayonet joint 108 to the socket bayonet joint 110, then locking the plug bayonet joint 108 to the socket bayonet joint 110 using ball bearings seated in corresponding raceways. This allows the plug bayonet joint 108 to swivel relative to the socket bayonet joint 110 via the ball bearings. The swivel bayonet joint 102 can be correspondingly unlocked for detachment by removing the ball bearings from the raceways. This allows the plug bayonet joint 108 to be decoupled from the socket bayonet joint 110. Assembly and/or disassembly can be done, for example, after the line pressure is at 0 PSIG (pounds per square inch gauge) and the pipeline is warmed to ambient temperature.

The plug bayonet joint 108 includes an insertion stem 112 having an insertion jacket 114 surrounding and co-axial with a plug inner line 116. The insertion jacket 114 is secured to the plug inner line 116 at an insertion end 118 of the stem 112.

The socket bayonet joint 110 includes a vacuum jacket 120 at a distal end thereof that sleeves over the insertion stem 112.

A swivel clamp 122 secures the plug bayonet joint 108 to the socket bayonet joint 110 so as to permit rotation of the first pipe section 104 relative to the second pipe section 106.

As illustrated, the plug bayonet joint 108 includes a first clamp member 124 that includes at least one race, e.g., illustrated as an inner bearing race 126. Each inner bearing race defines a groove that provides a seat for ball bearings as will be described in greater detail herein.

The first clamp member 124 is secured to the plug bayonet joint 108 so as to be axially aligned adjacent to a clamp end and thus may also define a first clamp mount block of the insertion stem 112. For instance, as illustrated, the first clamp member 124 is implemented as a first clamp mount block of the swivel clamp 122. The first clamp member 124/first clamp mount block may be of a dissimilar material to that of each inner bearing race 126 to provide heat insulation from extremely cold cryogenic fluid passing through the plug inner line 116.

The plug bayonet joint 108 also includes a first support strut 130 that supports a pipe jacket 132 co-axial with the plug inner line 116. As such, the swivel bayonet joint 102 restricts heat input into a cryogenic process fluid carried through the swivel bayonet joint 102, and maintains mechanical components of the swivel bayonet joint 102 at ambient temperatures while the cryogenic process fluid passes through the first pipe section 104 and second pipe section 106.

In the illustrated example, the inner bearing race 126 defines a pair of annular bearing slots for housing ball bearing sets 134, 136.

The socket bayonet joint 110 includes a second clamp member 138 that supports at least one race, e.g., illustrated as an outer bearing race 140. The second clamp member 138 is secured to the socket bayonet joint 110 and is aligned adjacent and co-axial with the vacuum jacket 120. The second clamp member 138 defines a second clamp mount block. The second clamp mount block may be of a dissimilar material to that of the outer bearing race 140 to provide heat insulation from extremely cold cryogenic fluids passing through the plug inner line 116.

In some embodiments, the first clamp member 124 is welded or attached to the inner vacuum jacketed plug bayonet joint (e.g., pipe jacket 132). Similarly, the second clamp member 138 is welded or attached to the outer vacuum jacketed socket bayonet joint 110.

To connect the first pipe section 104 to the second pipe section 106, the plug bayonet joint 108 is plugged into the socket bayonet joint 110.

When the plug bayonet joint 108 is mated with the socket bayonet joint 110, the race of the first clamp aligns with the race of the second clamp to define a clamp having a bearing aperture (e.g., the outer pair of race grooves aligns over the inner pair of race groves to provide a pair of bearing apertures to receive ball bearings). When ball bearings fill the bearing aperture(s), the ball bearings function to lock the plug bayonet joint 108 to the socket bayonet joint 110 so as to allow rotation therebetween. Thus, the clamp functions as a swivel clamp.

More particularly, once the bearing aperture is closed up, the ball bearings prevent the plug bayonet joint 108 from becoming disconnected from the socket bayonet joint 110 while allowing the plug bayonet joint 108 to rotate relative to the socket bayonet joint 110. Correspondingly, removing the ball bearings from the swivel clamp enables the plug bayonet joint 108 to be disconnected from the socket bayonet joint 110.

The swivel bayonet joint 102 can also include necessary seals between the inner bearing race 126 and the outer bearing race 140. For instance, the illustrated swivel bayonet joint 102 includes a dust seal 144 that seats in a corresponding dust seal cavity of the plug bayonet joint 108 and the socket bayonet joint 110. In the example implementation, the dust seal 144 sits in a recess in the first clamp member 124. For instance, the first clamp member 124 can form an overall "stair-step" shape. An upper end of the stair-step shape of the first clamp member 124 can define a recess in cooperation with an overhang of the first clamp member 124. For instance, first clamp member 124/first clamp mount block can include an "overhang" that creates a cavity for the dust seal 144 to sit in. The second clamp mount block 140 can include a corresponding finger that extends into an entrance of the cavity thereby securing or otherwise trapping the dust seal 144 within the cavity.

The illustrated swivel bayonet joint 102 can also include an O-ring seal 146. For instance, as illustrated, the O-ring seal 146 seats in corresponding O-ring seal cavity of the plug bayonet joint 108 and the socket bayonet joint 110. For instance, the illustrated O-ring seal 146 is positioned at the "bottom" of the stairstep shape of the first clamp member 124. In this regard, the O-ring seal 146 seats in a cavity within the second clamp mount block 140 radially adjacent to a concentric, planar surface of the "stairstep" of the first clamp member 124.

That is, the second clamp member 138 comprises a recess radially adjacent to a concentric, planar surface of the first clamp member 124, and the O-ring seal 146 sits in the recess. The first clamp member 124 comprises a surface that blocks an entrance of the recess, thus trapping the O-ring seal in the recess.

In some embodiments, the swivel bayonet joint 102 maintains the O-ring seal 146 at or near ambient temperature to be within parameters of the elastomer limits of the O-ring material specified.

In some embodiments, the seal cavities and corresponding seals (e.g., dust seal 144 and/or O-ring seal 146) can protect the ball bearing sets and any associated lubricants from contaminants that would impede optimum performance of the bearing races and enclosed ball bearing sets in allowing the plug bayonet joint 108 and socket bayonet joint 110 to swivel or rotate relative to each other about an axis parallel to flow of cryogenic fluids through the corresponding coupled first pipe section 104 and second pipe section 106. The seal(s) may include standard elastomer "O" ring types of seals made of materials such as Viton®, Buna-N Nitrile, Rubber, etc.

Yet further, the illustrated swivel bayonet joint 102 can include a water repelling spacer 148. The water repelling spacer 148 can be provided for reducing water droplets from entering into the ball bearing raceways contaminating the bearing lubricant and/or freezing that will impede rotation of the swivel joint 102. The water repelling spacer 148 is constructed from Polytetrafluoroethylene, e.g., as sold under the trademark Teflon® by Chemours. In other embodiments, the water repelling spacer 148 can be constructed out of a material (e.g., which may be similar to Polytetrafluoroethylene) that naturally repel water.

In some embodiments, the socket bayonet joint includes a mounting flange for direct mounting to a fixed structure in alignment with a hinge pin of a door or swing arm structure, wherein the first mounting block or the plug bayonet joint is attached or connected to the door or swing arm structure permitting rotating along the same pivot point as the door hinge or structure.

For instance, as illustrated, the swivel bayonet joint 102 can also include an optional flange 150. For instance, as illustrated, the flange 150 extends radially out from the second clamp mount block 140. As noted more fully herein, the flange 150 is not required to make the connection between the plug bayonet joint 108 and the socket bayonet joint 110. Rather, the optional flange 150 can be utilized to mount the pipe sections to a structure associated with the system that utilizes cryogenic piping, e.g., such as to serve as a hinge structure for a door or swing arm, e.g., to connect a fixed point of a structure to the door or swing arm. As illustrated, an aperture 152 passes through the flange 150, e.g., for securement to a fixed structure. In an example embodiment, this allows the plug bayonet joint 108 that is fixed to an end of the first pipe section 104 to rotate relative to the socket bayonet joint 110 that is fixed to a corresponding end of the second pipe section 106.

The swivel portion or the bayonet assembly can take a very high structure load, and the force imposed by the structural load is in the opposite direction of the force imposed by the internal pressure in the bayonet. For instance, in a practical application, the swivel is designed for an internal pressure of 1,000 pounds per square inch gauge (psig). However, in practice, the swivel can be designed for different pressures or pressure ranges.

In a practical application, the swivel joint 102 is structurally designed to be operational with an internal pressure of approximately 1,000 pounds per square inch gauge (psig). However, the swivel bayonet pipe portion of the assembly (plug bayonet joint 108 and socket bayonet joint 110) is designed to an operating pressure of 250 psig or less to reduce the thermal heat transfer from the piping components in the plug bayonet joint 108 and socket bayonet joint 110. This is accomplished by designing the plug bayonet joint 108 and socket bayonet joint 110 piping wall thickness to be as thin as possible, because the thinner the wall thickness of the piping the lower the heat leak in the bayonet component. This will keep the elastomer pressure seal from getting too cold and possibly failing.

By way of practical example, the swivel bayonet design may be subject to manufacturing constraints that limit some of the heat leak requirements. For instance, the attachment of the process pipe to the piping connecting at the swivel portion may be about 12" (about 30.48 centimeters) long in bayonet sizes from 1" (2.54 centimeters) to 10" (25.4 centimeters) pipe or tube. The reason for this length for most bayonet sizes is the machining constraints of the socket portion of the bayonet. The close tolerance between the plug and socket requires high tolerance machining. A tool such as a boring bar can be used to machine the inside surface of the socket. If the boring bar is over 12" (over about 30.48 centimeters) long in some pipe size it will start to chatter that will destroy the internal surface of the socket assembly. Therefore, the optimization of the bayonet portion must consider the manufacturing capability with the heat leak, pipe size, length of bayonet pipe, system operating pressure, and overall bayonet length.

That constraint is not limited to the swivel portion of the swivel bayonet joint designed herein and the swivel can be designed for different pressures or pressure ranges. The swivel portion of the bayonet is not in the pressure boundary but must restrain the resulting force imposed by the internal pressure. All pressure is maintained in the bayonet by the O-ring seal 146.

The pressure exerted on the swivel for a 4" (10.16 centimeters)×6" (15.24 centimeters) bayonet is:

$$C_1 = D^2\left(\frac{\pi}{4}\right)P = \text{pounds force}$$

D=5.952 O-ring groove dia. (inches)/(15.11808 centimeters)
P=1,000 internal pressure, (psi)
C1=27,824 load, (pounds force)

As another example, in a practical application, the bayonet portion can be designed for about 250 psig. So, the swivel can easily be designed to support or hang an offsetting load, say 15 to 20 thousand pounds mass, opposing the force from 1000 psi for a 4" (10.16 centimeters)×6" (15.24 centimeters) size swivel bayonet joint from the hinge portion of the bayonet. This does not constrain the overall operation of the swivel bayonet joint and cryogenic fluid can flow through the swivel bayonet assembly as well.

As another example, in a practical application, the bayonet pipe portion can be designed for about 250 psig. So the swivel can easily be an offsetting load, say 15 to 20 thousand pounds of cantilevered door or swing arm.

In use, a cryogenic pipe can be provided by the manufacturer to have a plug bayonet joint 108 at one end and a socket bayonet joint 110 at an opposed other end. In a field usage such as connecting two sections of pipe, or a section of pipe of a cryogenic fluid dispensing arm to a section of pipe, the dust seal 144 an the O-ring seal 146 are seated in their respective seal cavities. Next, the insertion stem 112 brought into cooperation with the vacuum jacket 120 of the socket bayonet joint 110. The ball bearing sets 134, 136 are then inserted through bearing access holes into the corresponding bearing slots of the inner and outer races, appropriate lubrication is applied to the bearing slots, and the bearings are then secured within the slots by the first and second bearing plugs.

When a cryogenic fluid passes through the socket inner line and plug inner line, some of the fluid will move between the insertion end of the insertion stem and the line end of the receiving sleeve and into an interface between the insertion stem and the receiving sleeve. The insertion stem is dimensioned to have an outer diameter slightly smaller than an inner diameter of the receiving sleeve, and the insertion stem is dimensioned to have a first axial length from its clamp end to its insertion end that is slightly shorter than a second axial length of the receiving sleeve from its clamp end to its line end so that the a very high tolerance fit is established between the insertion stem and receiving sleeve. The very high tolerance fit between the insertion stem and receiving sleeve extends along the first axial length which is a length sufficient for formation of a vapor trap by the cryogenic fluid along the first axial length of the insertion stem between its insertion end and the clamp end of the receiving sleeve.

The vapor trap prohibits movement of the cryogenic fluid beyond the trap and thereby prohibits contact between the fluid and clamp ends of the plug bayonet joint 108 and socket bayonet joint 110. Consequently, the mechanical components of the swivel joint 102, such as the inner and outer bearing races, first and second seals, ball bearing sets and associated lubricants remain at ambient temperatures, insulated from the extremely cold temperatures of the cryogenic fluids, and hence the mechanical components may be manufactured of standard materials and lubricated with standard lubricants that would ordinarily not function at cryogenic temperatures.

In a practical application, a ratio between an axial length (e.g., as defined between the insertion end and clamp end of the insertion stem), and a length (e.g., as defined as a diameter of the plug inner line) may vary based on the size of the swivel bayonet joint. By way of illustrative example, the ratio may be 1/12 to 10/12 or anywhere in between, etc.

Similarly, a ratio between an axial length (e.g., defined between the line end and clamp end of the receiving sleeve) and a length (e.g., as defined as a diameter of the socket inner line) may vary based on the size of the swivel bayonet joint. By way of illustrative example, the ratio may be 1/12 to 10/12 or anywhere in between, etc.

Second Example Swivel Bayonet

Figure 2A:
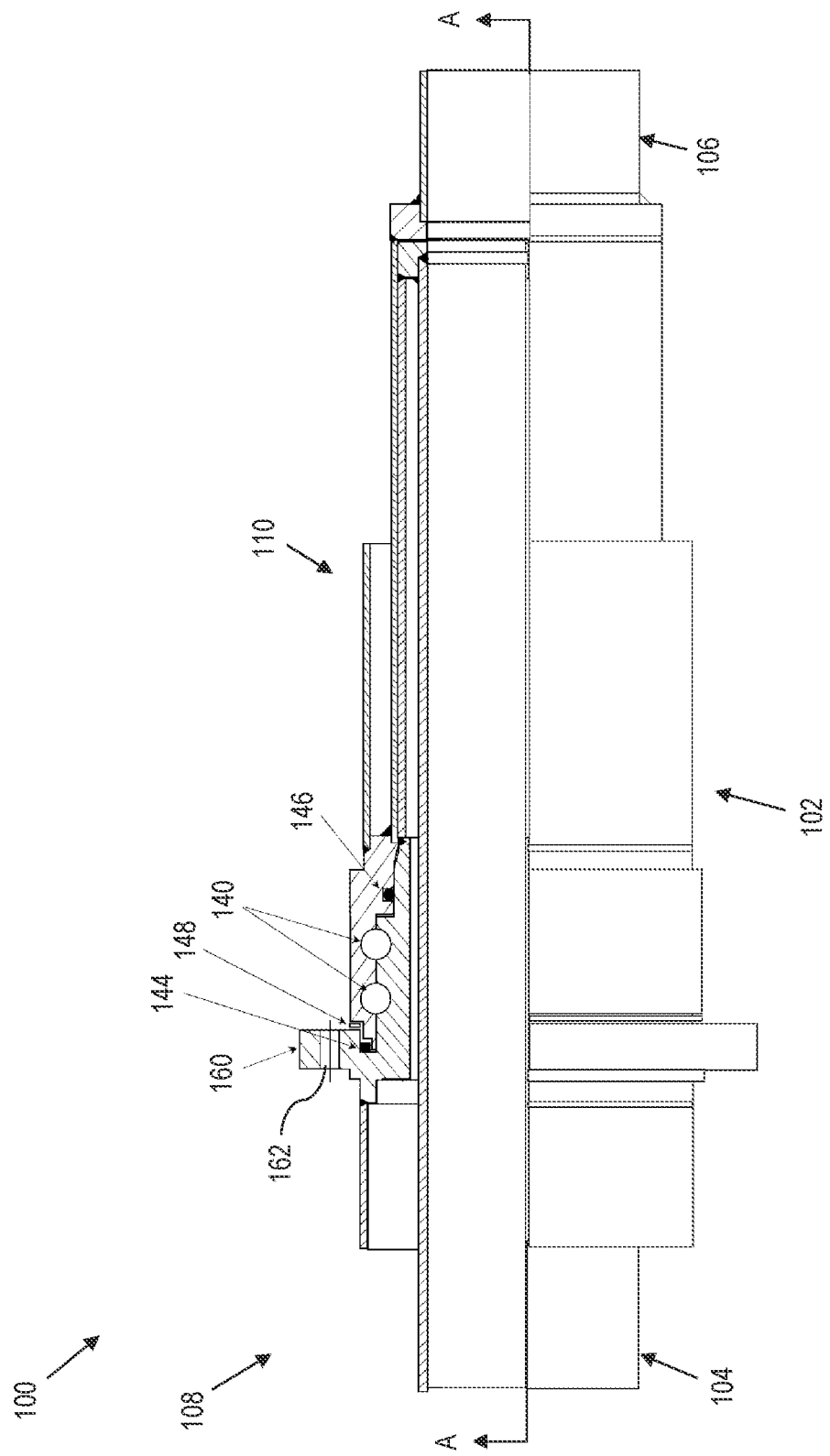
FIG. 2A is an illustration of an example swivel bayonet joint with a second flange mount configuration, according to aspects of the present disclosure.
Figure 2B:
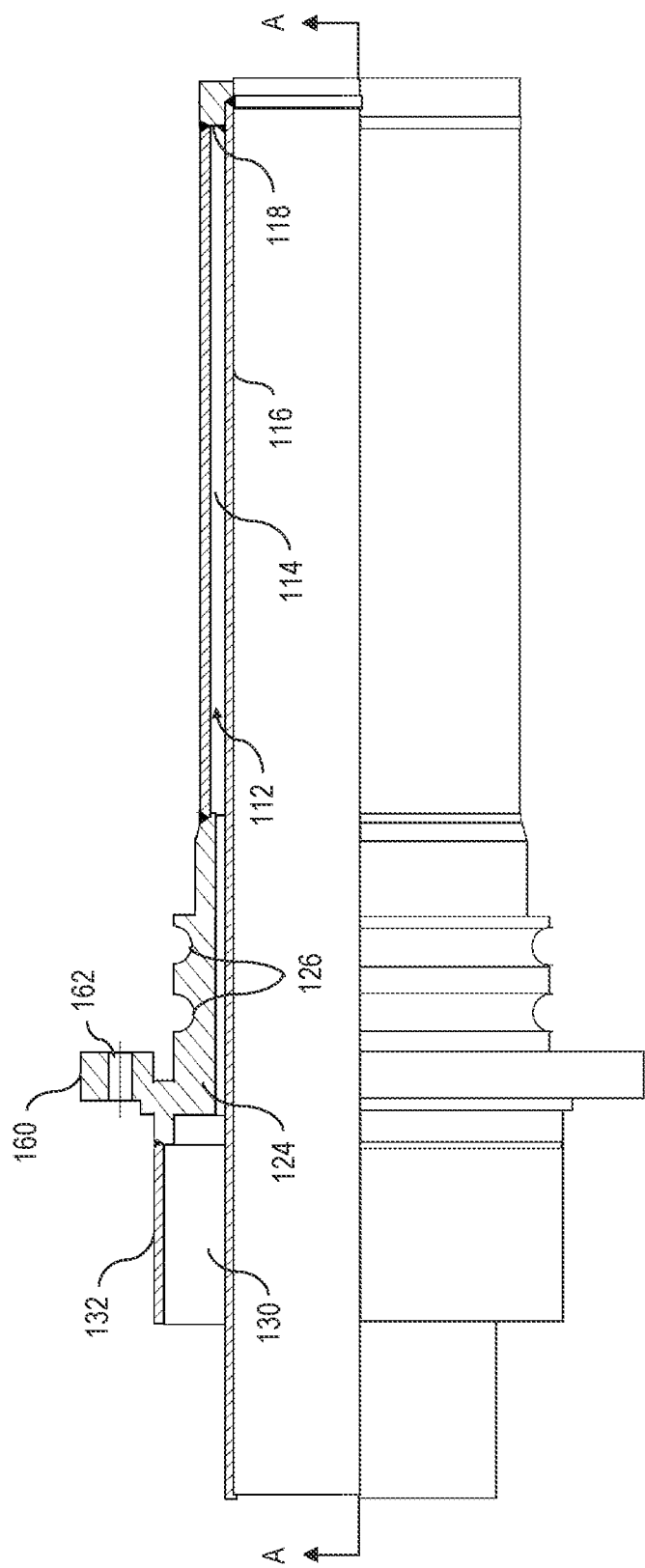
FIG. 2B is an illustration of a plug component of the example swivel bayonet joint of FIG. 2A according to aspects of the present disclosure.

Referring now to FIGS. 2A and 2B, a swivel bayonet joint is illustrated according to yet another embodiment. The swivel joint bayonet of FIGS. 2A and 2B is analogous to the swivel bayonet joint of FIG. 1A, FIG. 1B, and FIG. 1C except where expressly noted below. In this regard, like structure is indicated with like reference numbers and the description of FIG. 1A, FIG. 1B, and FIG. 1C is incorporated into the description of FIG. 2A and FIG. 2B. Accordingly, the description of elements in FIG. 2A and FIG. 2B that are analogous to those of FIG. 1A, FIG. 1B, and FIG. 1C are omitted for conciseness.

FIG. 2A illustrates the plug bayonet joint 108 and the socket bayonet joint 110 in an assembled state. FIG. 2B illustrates the plug bayonet joint 108 to illustrate differences from the previous embodiments.

For instance, the plug bayonet joint 108 of FIG. 1B is analogous to the plug bayonet joint 108 of FIG. 2A. Likewise, the socket bayonet joint 110 in the embodiment of FIG. 1C is analogous to the socket bayonet joint 110 in the embodiment of FIG. 2A. As such, details are omitted for clarity. However, in the embodiment of FIG. 2A, the flange 150 of FIG. 1A, FIG. 1C is relocated to the swivel plug side and is thus shown in FIG. 2B.

FIG. 2A and FIG. 2B is an illustration of an example swivel bayonet joint with a flange mount on a plug bayonet, according to aspects of the present disclosure. In particular, the flange 150 and corresponding aperture 152 of FIG. 1 are omitted in the embodiment of FIG. 2A, FIG. 2B. Rather, a flange 160 having an aperture 162 extends radially out from the first clamp member 124.

The flange 160 is otherwise analogous to the flange 150 of FIG. 1, and thus can be used for mounting to a structure and will allow the socket bayonet joint 110 that is fixed to the corresponding end of the second pipe section 106 to rotate relative to the plug bayonet joint 108 that is fixed to an end of the first pipe section 104.

For instance, the optional flange 160 can be utilized to mount the pipe sections to a structure associated with the system that utilizes cryogenic piping, e.g., such as to serve as a hinge structure for a door or swing arm, e.g., to connect a fixed point of a structure to the door or swing arm.

Third Example Swivel Bayonet

Figure 3:
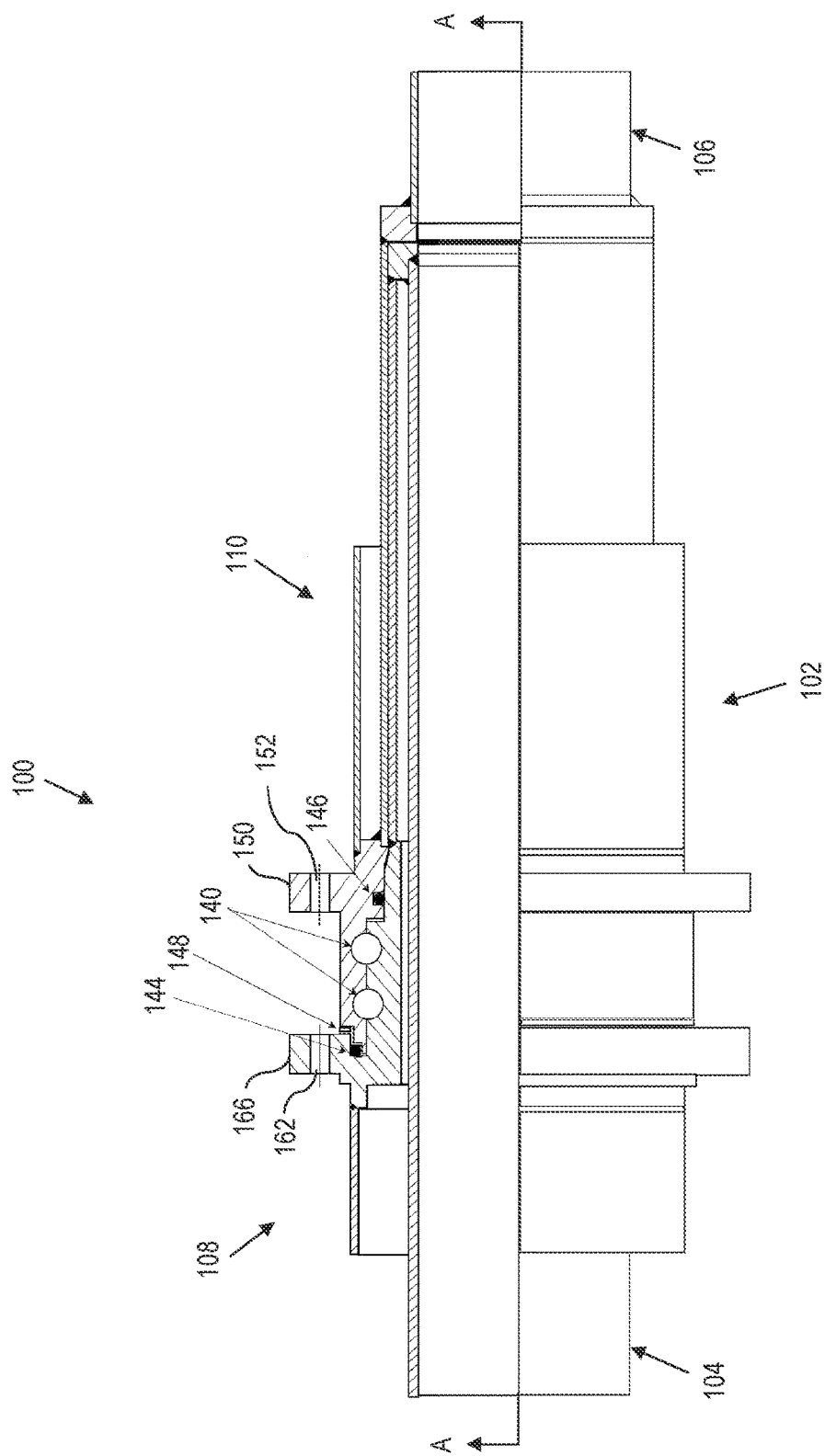
FIG. 3 is an illustration of an example swivel bayonet joint with a third flange mount configuration, according to aspects of the present disclosure.

Referring now to FIG. 3, a swivel bayonet joint is illustrated according to yet another embodiment in an assembled state. The swivel joint bayonet of FIG. 3 is analogous to the swivel bayonet joint of FIG. 1A, FIG. 1B, and FIG. 1C except where expressly noted below. In this regard, like structure is indicated with like reference numbers and the description of FIG. 1A, FIG. 1B, and FIG. 1C is incorporated into the description of FIG. 3. Accordingly, the description of elements in FIG. 3 that are analogous to those of FIG. 1A, FIG. 1B, and FIG. 1C are omitted for conciseness.

FIG. 3 is an illustration of an example swivel bayonet joint with a flange mount on a plug bayonet as well as a flange mount on a socket bayonet, according to aspects of the present disclosure. In particular, the flange 150 and corresponding aperture 152 of FIG. 1A, FIG. 1C are included in the embodiment of FIG. 3. Additionally, a flange 160 having an aperture 162 extends radially out from the first clamp member 124 analogous to the flange 160 of FIG. 2A. The flange 150 and the flange 160 thus can be used as a hinge for mounting a door or swing arm. This configuration using two or more flanges (e.g., flange 150 and flange 160) having their flange apertures aligned (e.g., flange aperture 152 axially aligned with flange aperture 162) as a standard hinge will be able to flow cryogenic fluid through the first pipe section 104 and second pipe section 106 but also support a door or swing arm.

Fourth Example Swivel Bayonet

Figure 4:
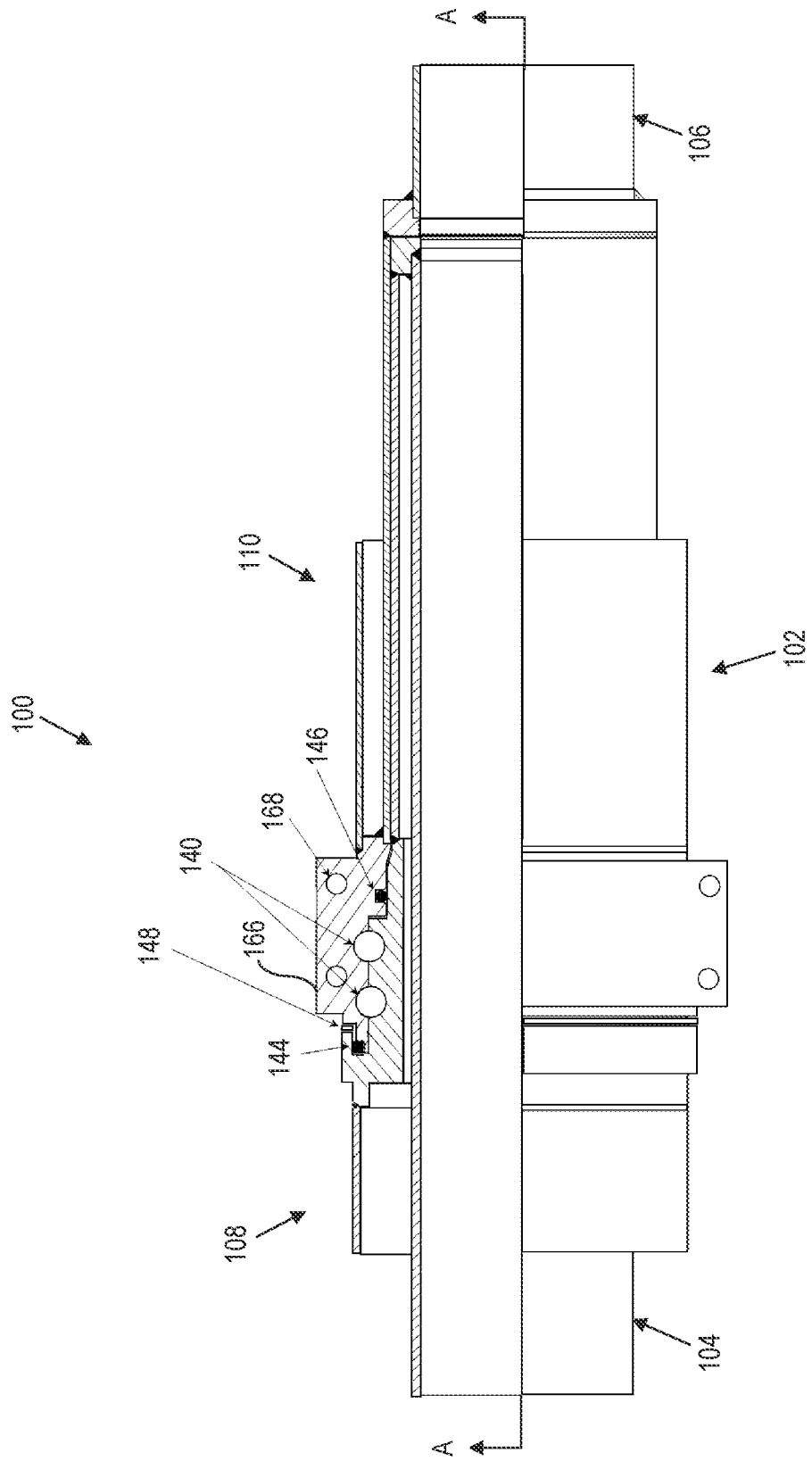
FIG. 4 is an illustration of an example swivel bayonet joint with a side mount according to aspects of the present disclosure.

Referring now to FIG. 4, a swivel bayonet joint is illustrated according to another embodiment. The swivel joint bayonet of FIG. 4 is analogous to the swivel bayonet joint of FIG. 1A, FIG. 1B, and FIG. 1C except where expressly noted below. In this regard, like structure is indicated with like reference numbers and the description of FIG. 1A, FIG. 1B, and FIG. 1C is incorporated into the description of FIG. 4. Accordingly, the description of elements in FIG. 4 that are analogous to those of FIG. 1A, FIG. 1B, and FIG. 1C are omitted for conciseness. FIG. 4 illustrates the plug bayonet joint 108 and the socket bayonet joint 110 in an assembled state.

FIG. 4 is an illustration of an example swivel bayonet joint with a side mount according to aspects of the present disclosure. Compared to FIG. 1A, FIG. 1B, and FIG. 1C, a difference is that the flange 150 of FIG. 1 is replaced by a rectangular mount 166 having mounting holes 168.

The mount implemented by the flange 160 can be helpful, for example, for cryogenic systems in buildings or laboratories that allows easy mounting to a wall or structure for free movement of the vacuum jacketed piping connected to the swivel bayonet joint.

That is, the socket bayonet joint 110 includes a rectangular or square outer surface with through holes for attaching to a fixed structure in alignment with a centerline of a hinge pin with spacers between the structure and swivel bayonet joint to align on the centerline axis of the hinge pin.

Fifth Example Swivel Bayonet

Figure 5:
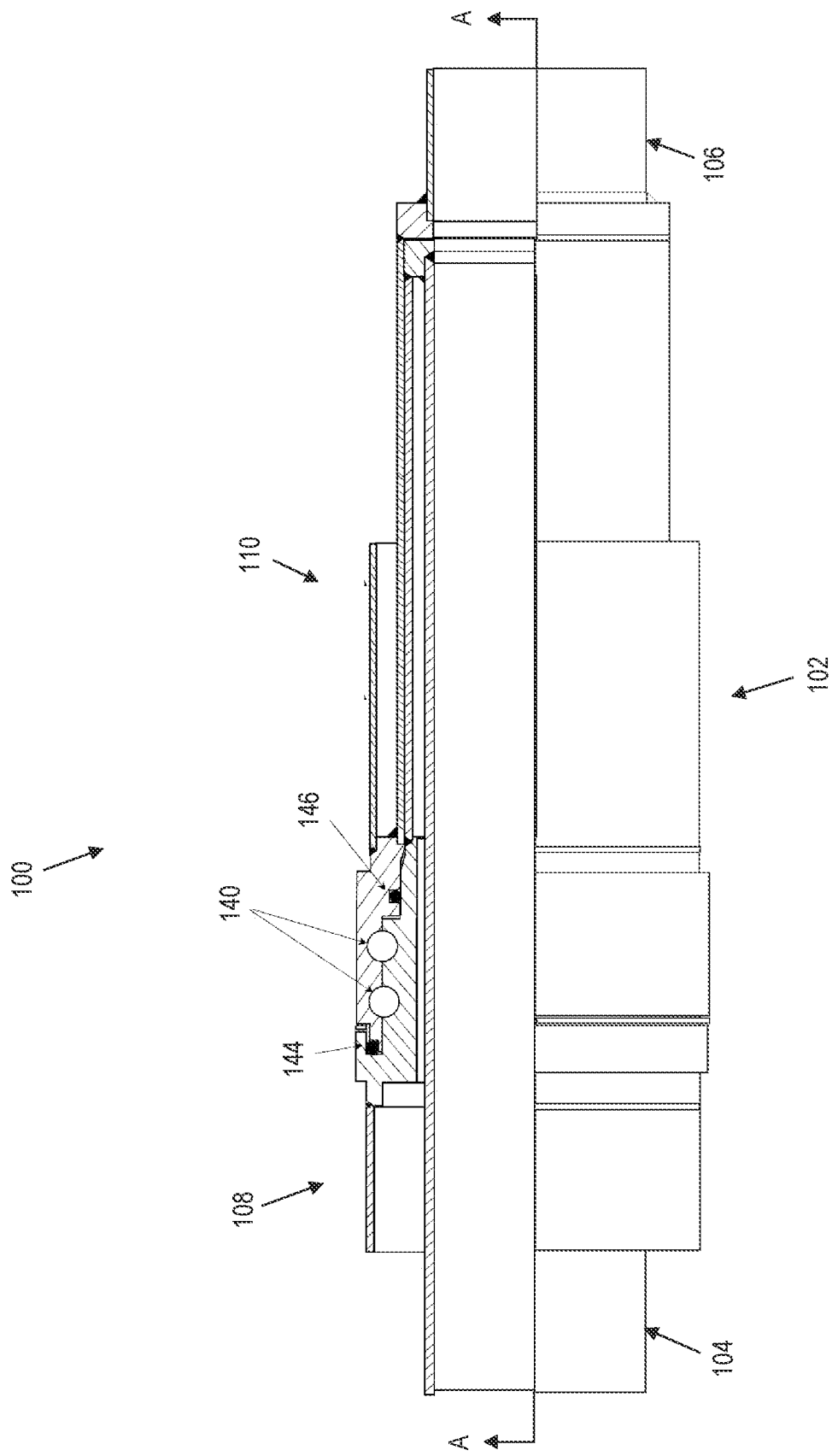
FIG. 5 is an illustration of an example swivel bayonet joint with pipe mounts at the ends, according to aspects of the present disclosure.

Referring now to FIG. 5, a swivel bayonet joint is illustrated according to yet another embodiment. The swivel joint bayonet of FIG. 5 is analogous to the swivel bayonet joint of FIG. 1A, FIG. 1B, and FIG. 1C except where expressly noted below. In this regard, like structure is indicated with like reference numbers and the description of FIG. 1A, FIG. 1B, and FIG. 1C is incorporated into the description of FIG. 5. Accordingly, the description of elements in FIG. 5 that are analogous to those of FIG. 1A, FIG. 1B, and FIG. 1C are omitted for conciseness. FIG. 5 illustrates the plug bayonet joint 108 and the socket bayonet joint 110 in an assembled state.

Also, FIG. 5 is an illustration of an example swivel bayonet joint with pipe mounts at the ends, according to aspects of the present disclosure.

The example mounts in the piping system are free to rotate without constraint of a fixed structure tied to the swivel bayonet joint. Thus for example, the embodiment of FIG. 5 can be applied where more than one swivel bayonet joint is used in the same process line that requires movement in multiple directions at the same time. It can also be used where a mounting structure is not available.

In this embodiment, the swivel joint bayonet 110 is free mounting with no mounting requirements, such that the swivel joint is in a second position in a swing arm (e.g., such as an elbow of your arm, and is supported by piping connection on either end of the swivel joint bayonet.

Sixth Example Swivel Bayonet

Figure 6:
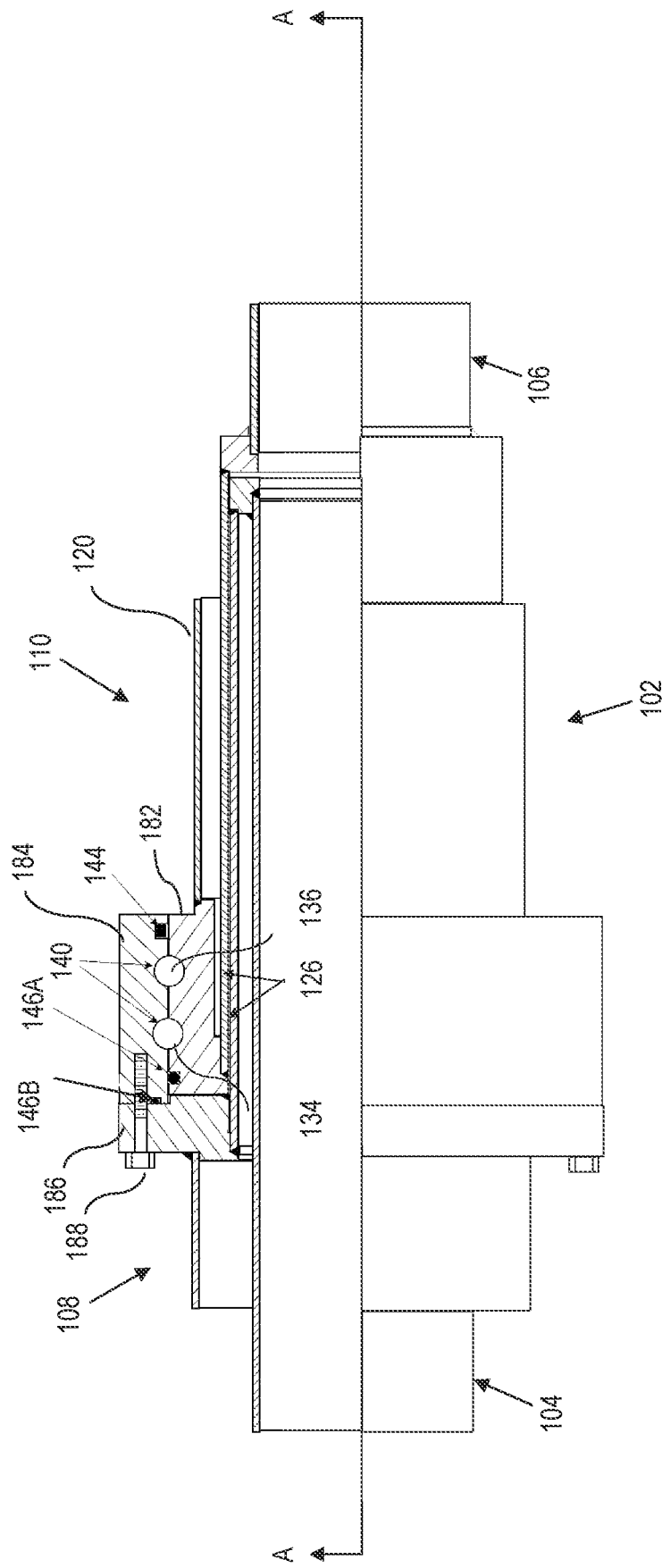
FIG. 6 is an illustration of an example swivel bayonet joint with an outer race on a socket bayonet installed in cooperation with a plug bayonet, according to aspects of the present disclosure.

Referring now to FIG. 6, a swivel bayonet joint is illustrated according to yet another embodiment. The swivel joint bayonet of FIG. 6 is analogous to the swivel bayonet joint of FIG. 1A, FIG. 1B, and FIG. 1C except where expressly noted below. In this regard, like structure is indicated with like reference numbers and the description of FIG. 1A, FIG. 1B, and FIG. 1C is incorporated into the description of FIG. 6. Accordingly, the description of elements in FIG. 6 that are analogous to those of FIG. 1A, FIG. 1B, and FIG. 1C are omitted for conciseness. FIG. 6 illustrates the plug bayonet joint 108 and the socket bayonet joint 110 in an assembled state.

FIG. 6 is an illustration of an example swivel bayonet joint with an outer race on a socket bayonet installed in cooperation with a plug bayonet, according to aspects of the present disclosure.

Also, similar to the previous embodiments, the swivel bayonet joint 102 of FIG. 6 can be dismantled and assembled easily in the field. For instance, as will be described in greater detail herein, the swivel bayonet joint 102 can be assembled by coupling the plug bayonet joint 108 to the socket bayonet joint 110, then locking the plug bayonet joint 108 to the socket bayonet joint 110 using ball bearings seated in corresponding raceways. This allows the plug bayonet joint 108 to swivel relative to the socket bayonet joint 110 via the ball bearings. However, in the embodiment of FIG. 6, the swivel bayonet joint 102 can be correspondingly unlocked for detachment by removing the ball bearings from the raceways (as per previous embodiments), but also by removing bolt(s) that secure the plug bayonet joint 108 to the socket bayonet joint 110 via a mount configuration described below. This allows the plug bayonet joint 108 to be decoupled from the socket bayonet joint 110. Assembly and/or disassembly can be done, for example, after the line pressure is at 0 psig and the pipeline is warmed to ambient temperature.

In the embodiment of FIG. 6, a mount comprises an under mount 182, an over mount 184 and a side mount 186. The under mount 182 is positioned axially adjacent to the vacuum jacket 120 and includes the inner bearing race 126 that defines the first and second annular bearing slots for housing the ball bearing sets 134, 136.

Correspondingly, the over mount 184 extends radially outward from the under mount 182. The over mount 184 includes the outer bearing race 140. The outer bearing race 140.

The side mount 186 is coupled to the plug bayonet joint 108 and include an aperture such that a fastener 188 (e.g., a bolt) can pass through the aperture and thread into a corresponding threaded aperture in the over mount 184.

The embodiment of FIG. 6 also includes a modified seal configuration compared to FIG. 1A. For instance, compared to FIG. 1A, the swivel bayonet joint of FIG. 6 relocates the dust seal 144 from its position described in FIG. 1A, to position proximate to the vacuum jacket 120. In particular, the dust seal 144 seats into a seal well recessed into an underside of the over mount 184 so that the dust seal 144 seats between the seal well of the over mount 184 and a flat, axial extending surface of the under mount 182.

Additionally, there are two O-rings including a first O-ring seal 146A and a second O-ring seal 146B. The first O-ring seal 146A seats in a well recessed into an upper planar surface of the under mount 182 opposite the raceways compared to the dust seal 144. Thus, the first O-ring seal 146A sits between the underside of the over mount 184 and the well of the under mount 182. The first O-ring seal 146A thus defines a rotating seal. The second O-ring seal 146B seats in a well recessed into a side surface of the over mount 184 adjacent to a planar surface of the side mount 186. The second O-ring seal 146B thus defines a static seal.

Example Raceway

Figure 7:
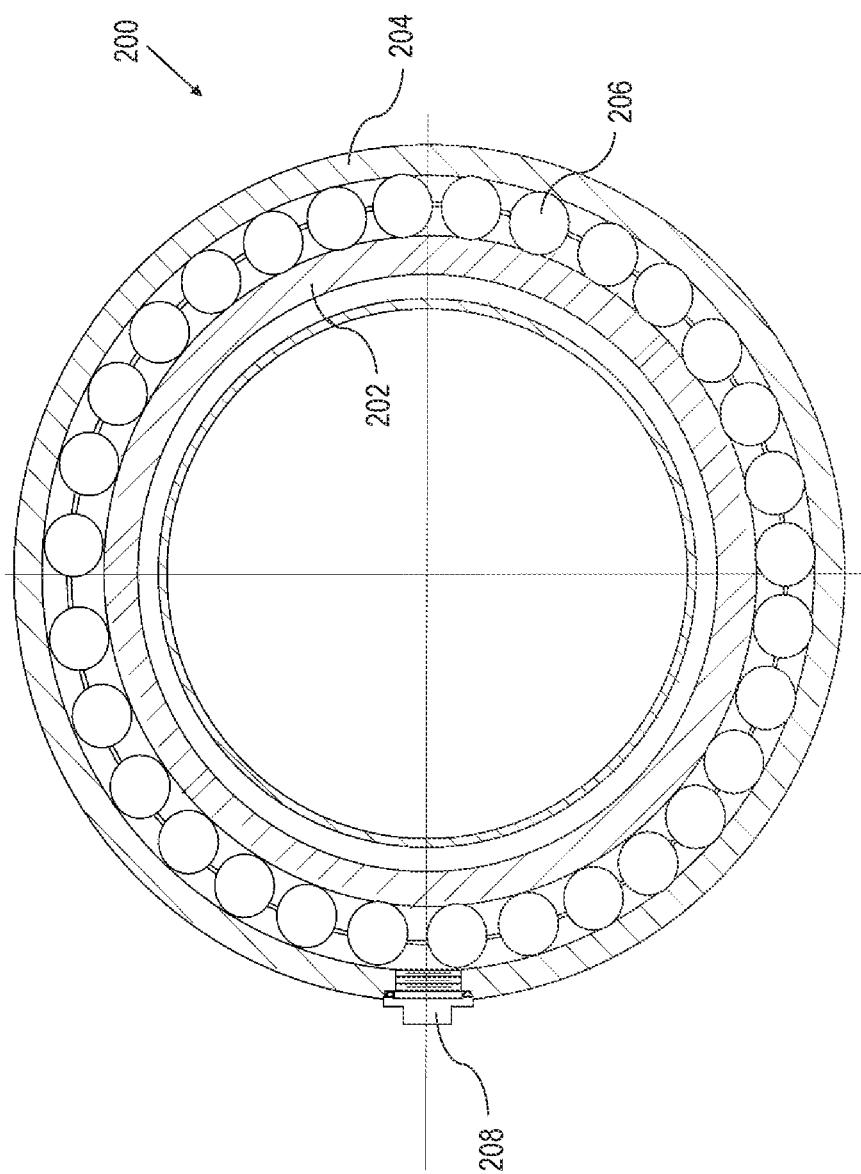
FIG. 7 is an example cross-sectional view of a ball bearing raceway for use with a swivel bayonet joint, according to aspects of the present disclosure.

FIG. 7 is an example cross-sectional view of a ball bearing system 200 for use with a swivel bayonet joint, according to any of the previously disclosed embodiments. The ball bearing system 200 is an annular configuration that defines an inner race 202 and an outer race 204 defining a bearing aperture therebetween, which can hold a ball bearing set 206. The ball bearing system 200 of FIG. 7 can implement the inner race, bearing sets 134, 136, and outer race of any of the embodiments of FIG. 1A-FIG. 6.

The ball bearing system 200 can also include a bearing access port and corresponding plug 208. Removal of the plug 208 allows access to the bearing aperture, e.g., to add lubricant, ball bearings, etc., to lock a corresponding plug bayonet joint to the socket bayonet joint (shown in the embodiments of FIG. 1A-FIG. 6). Return of the plug 208 contains the ball bearings, lubricant, etc., within the bearing aperture. Correspondingly, the plug 208 can be removed to expel the bearing from the bearing aperture, e.g., to unlock the corresponding plug bayonet joint from the socket bayonet joint (shown in the embodiments of FIG. 1A-FIG. 6).

Embodiment Side-By-Side

Figure 8:
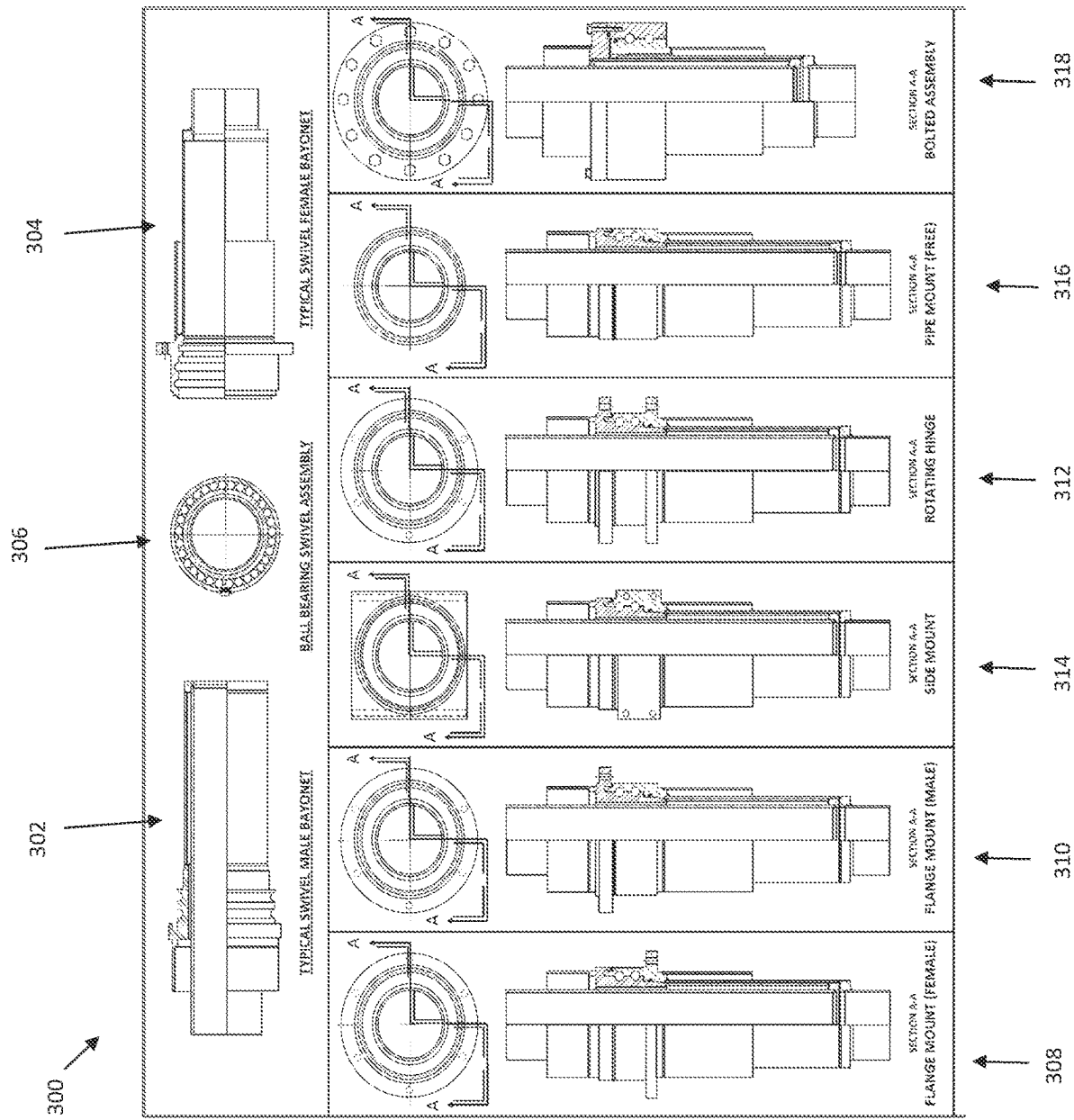
FIG. 8 is a summary of various embodiments of a swivel bayonet joint configurations described in the preceding FIGURES to clarify the cross-sectional views.

Referring to FIG. 8, an overview 300 shows the various embodiments of the swivel bayonet joint in side-by-side view to clarify the cross-sectional views relative to a corresponding end view.

For instance, the overview 300 illustrates the plug bayonet joint 108 of FIG. 1B as a swivel male bayonet 302.

The overview 300 also illustrates the corresponding socket bayonet joint 110 of FIG. 1C as a swivel female bayonet 304.

The overview 300 illustrates the ball bearing system 200 of FIG. 7 as a ball bearing swivel assembly 306.

The overview 300 illustrates the swivel bayonet joint system 100 of FIG. 1A-FIG. 1C, including the plug bayonet joint and socket bayonet joint coupled together as a flange mount (female) swivel bayonet joint system 308, showing an end view to clarify the cross-sectional cut of the corresponding side view.

The overview 300 illustrates the swivel bayonet joint system 100 of FIG. 2A-FIG. 2B, including the plug bayonet joint and socket bayonet joint coupled together as a flange mount (male) swivel bayonet joint system 310, showing an end view to clarify the cross-sectional cut of the corresponding side view.

The overview 300 illustrates the swivel bayonet joint system 100 of FIG. 3, including the plug bayonet joint and socket bayonet joint coupled together as a rotating hinge swivel bayonet joint system 312, showing an end view to clarify the cross-sectional cut of the corresponding side view.

The overview 300 illustrates the swivel bayonet joint system 100 of FIG. 4, including the plug bayonet joint and socket bayonet joint coupled together as a side mount swivel bayonet joint system 314, showing an end view to clarify the cross-sectional cut of the corresponding side view.

The overview 300 illustrates the swivel bayonet joint system 100 of FIG. 5, including the plug bayonet joint and socket bayonet joint coupled together as a pipe mount (free) swivel bayonet joint system 316, showing an end view to clarify the cross-sectional cut of the corresponding side view.

The overview 300 illustrates the swivel bayonet joint system 100 of FIG. 6, including the plug bayonet joint and socket bayonet joint coupled together as a bolted assembly swivel bayonet joint system 318, showing an end view to clarify the cross-sectional cut of the corresponding side view.

Seventh Example Swivel Bayonet

Figure 9A:
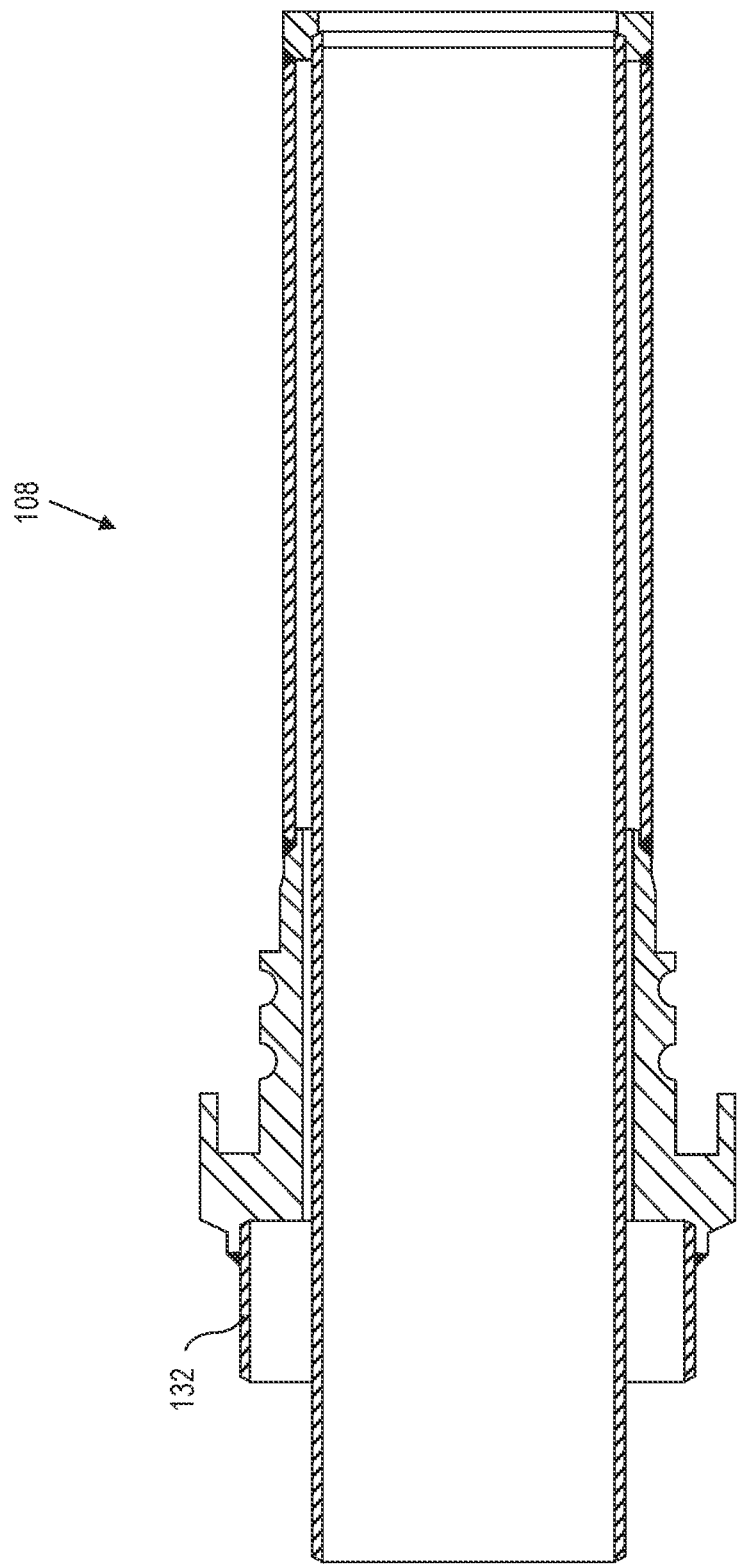
FIGS. 9A-C are illustrations of an example swivel bayonet joint with a dust seal groove, according to various aspects of the present disclosure.
Figure 9B:
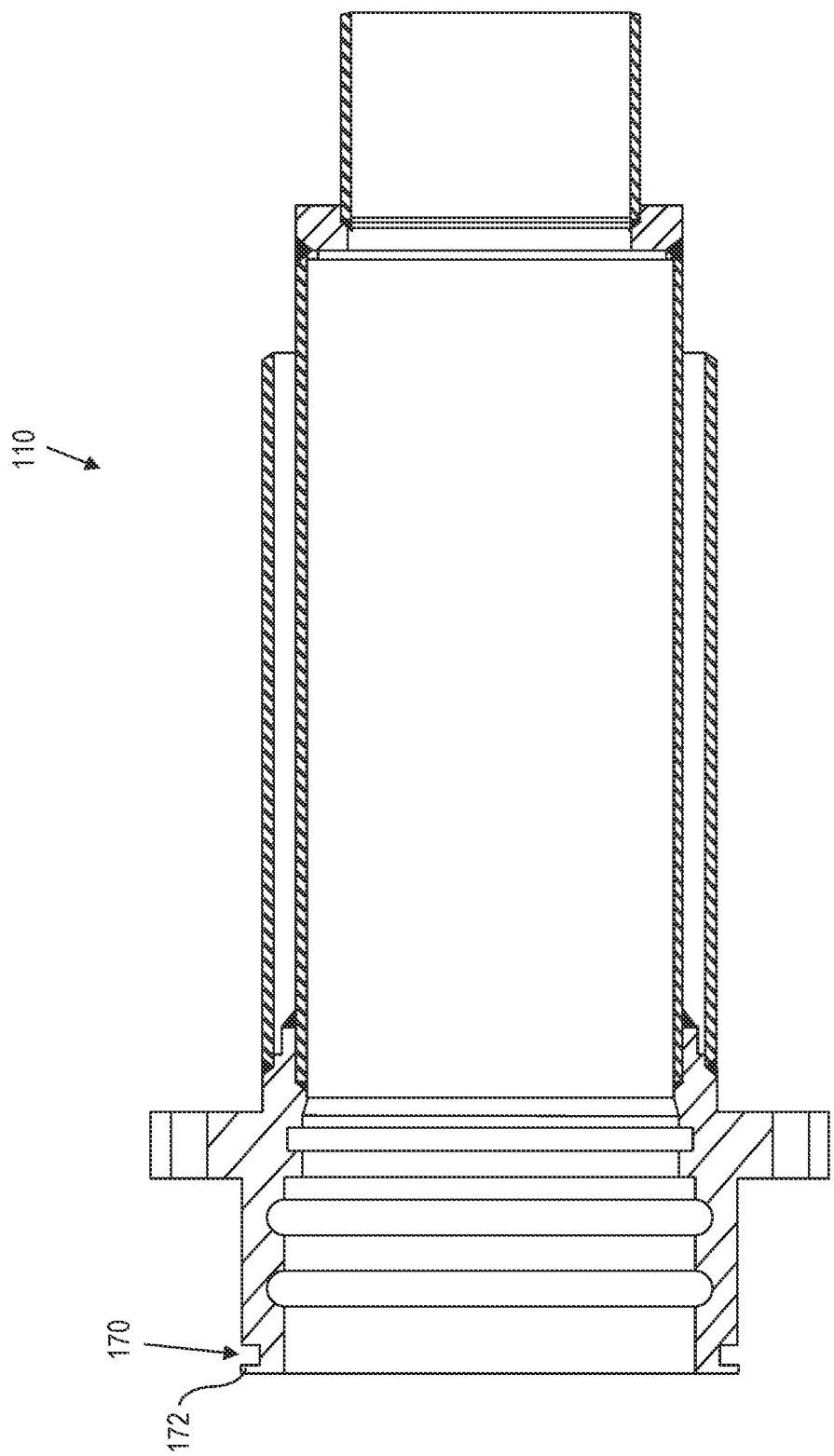
Figure 9C:
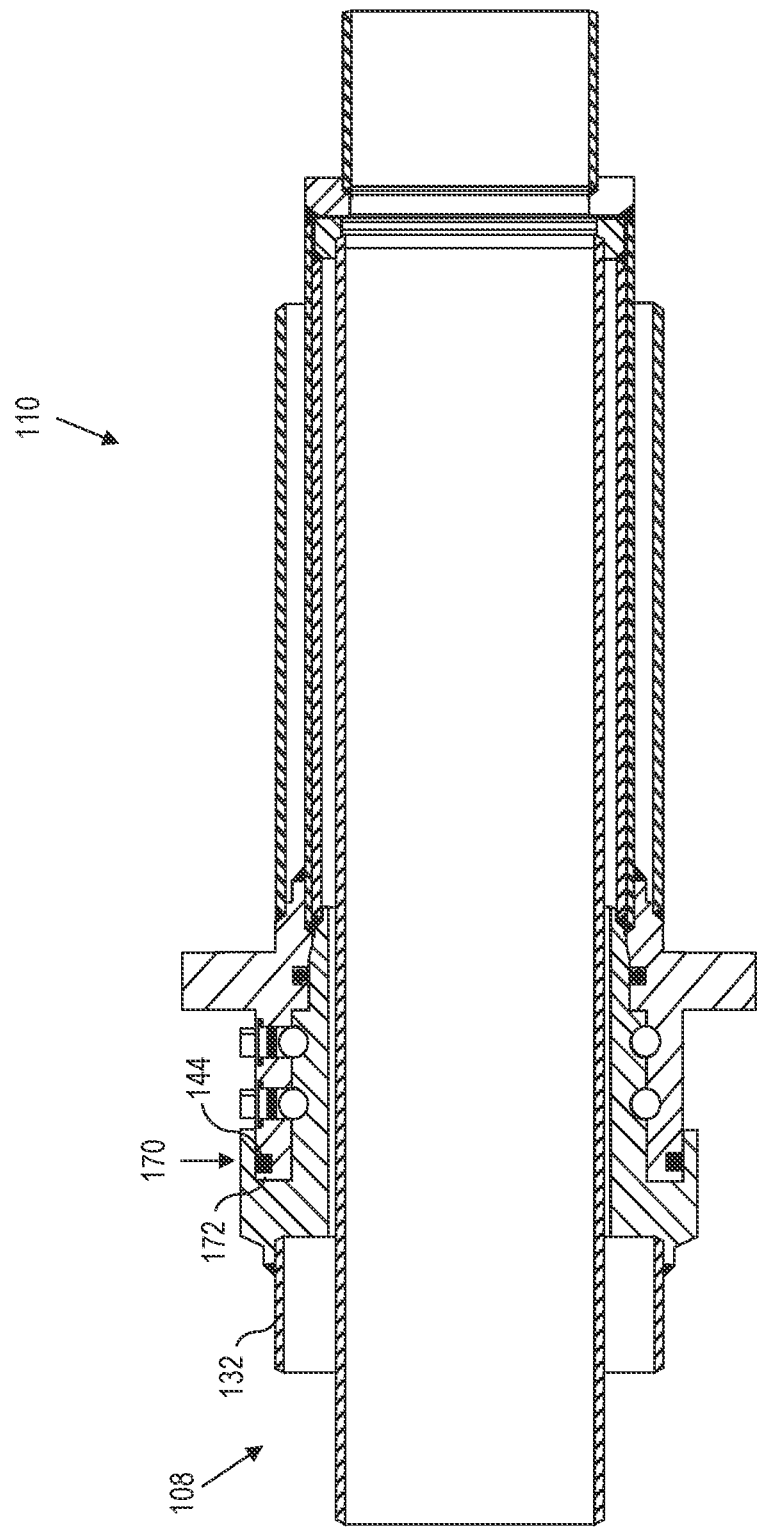

Referring now to FIGS. 9A-C, a swivel bayonet joint is illustrated according to yet another embodiment in an assembled state. The swivel joint bayonet of FIGS. 9A-C is analogous to the swivel bayonet joint of FIG. 1A, FIG. 1B, and FIG. 1C except where expressly noted below. In this regard, like structure is indicated with like reference numbers and the description of FIG. 1A, FIG. 1B, and FIG. 1C is incorporated into the description of FIGS. 9A-C. Accordingly, the description of elements in FIGS. 9A-C that are analogous to those of FIG. 1A, FIG. 1B, and FIG. 1C are omitted for conciseness.

FIGS. 9A-C are an illustration of an example swivel bayonet joint with a dust seal groove (including a lip) that keeps the dust deal in place while the swivel bayonet joint is being assembled. This dust seal groove reduces a chance for injury on part of the assembler, because the lip prevents the dust seal from falling out during assembly. In particular, the socket bayonet joint 110 includes a dust seal groove 170 bound by a dust seal lip 172. The lip 172 keeps the dust seal from falling out when the socket bayonet joint 110 by slightly compressing the dust seal, because the dust seal groove is slightly smaller than a thickness of the dust seal. Further, the plug bayonet joint 108 includes a lip that overlaps the pipe jacket 132 (as opposed to being flush with the pipe jacket as in FIG. 1).

Miscellaneous

Referring generally to the FIGURES, an embodiment can optionally include any one or more of the following, in any combination.

In some embodiments, the inner race is welded or attached to the inner vacuum jacketed plug bayonet.

In some embodiments the outer race is welded or attached to the outer vacuum jacketed socket bayonet.

In some embodiments, the outer race or socket bayonet joint includes a mounting flange for direct mounting to a fixed structure in alignment with a hinge pin of a door or swing arm structure. In this configuration, the inner race or plug bayonet joint is attached or connected to the door or swing arm structure permitting rotating along the same pivot point as the door hinge or structure.

In some embodiments, the plug bayonet joint includes a mounting flange for direct mounting to a fixed structure in alignment with a hinge pin of a door or swing arm structure. In this configuration, socket bayonet joint is attached or connected to the door or swing arm structure permitting rotating along the same pivot point as the door hinge or structure.

In some embodiments, the plug bayonet joint and the socket bayonet joint each includes a mounting flange for direct mounting to a fixed structure.

In some embodiments, the outer race or socket bayonet joint has a rectangular or square outer surface with through holes for attaching to a fixed structure in alignment with a centerline of a hinge pin with spacers between the structure and swivel bayonet joint to align on the centerline axis of the hinge pin.

In some embodiments the swivel bayonet joint is free mounting with no mounting requirements. This swivel joint is in second position in swing arm like an elbow of your arm. It is supported by the piping connection on either end of the swivel joint bayonet or swivel bayonet joint.

In some embodiments, all welding and stress relieving is completed before machining. No welding is required after machining that could cause distortion to occur to the high tolerances of the swivel joint bayonet assembly between the plug and socket bayonet.

The swivel joint bayonet can be constructed of austenitic stainless-steel material compatible with the cryogenic fluids.

In some embodiments, the swivel bayonet joint has an inner and outer pipe connection at either end with a vacuum space in an annular space that reduces the heat input into the cryogenic fluid such as, Helium, Hydrogen, Neon, Nitrogen, Oxygen, Methane or Liquefied Natural Gas (LNG) and any other cryogenic fluid or low temperature fluids that are sensitive to atmospheric ambient temperatures.

The heat input can be determined by the length and wall thickness of the plug and socket bayonet pipes or tubes, e.g., which are machined to a high tolerance fit between the plug and socket bayonets. The small gap between the plug and socket bayonets can cause a static vapor trap to reduce the heat transfer in the fluid from the warm end of the bayonet to the cold end of the bayonet. The wall thickness is determined by the design and or operating pressure of the fluid in the piping system and the thickness is optimized to reduce the conductive heat transfer into the fluid.

In some embodiments, the system will maintain the O-ring seal at or near ambient temperature to be within parameters of the elastomer limits of the O-ring material specified.

In some embodiments, the swivel portion of the bayonet joint includes a single or multiple inner and outer races with ball bearings within the races.

In some embodiments, the bayonet joint includes a dust seal, and the second clamp member includes a dust seal groove with a dust seal lip. The dust seal rests in the dust seal groove, and the lip prevents the dust seal from falling out of the dust seal groove by slightly compressing the dust seal.

The swivel joints can be lubricated with hydrocarbon and non-hydrocarbon greases appropriate for the cryogenic fluid within the piping system. The swivel joint ball bearings will not be exposed to the operating temperature or pressure within the piping system. They will be on the other side of the O-ring seal. The swivel joint will be responsible for maintaining the piping together and are subject to the force imposed by the pressure with the piping system.

Scaling of the size of the swivel bayonet joints from small to large is achieved without distortion between the plug bayonet joint and socket bayonet joint by not welding after machining. For instance, some embodiments allow (simple) scaling of size of the swivel bayonet joints from small to large without the possibility of distortion between the plug and socket of the swivel joint assembly because no welding is required after machining, thus allowing high tolerances to be maintained.

In some embodiments, the socket bayonet joint bayonet is provided with a threaded access port at each raceway to insert the ball bearings in the assembly after the plug swivel bayonet joint is assembled and aligned with the raceway.

The access port can optionally include a threaded cap that is aligned with the outer diameter of the bearing raceway and may include an O-ring seal to keep grease from escaping the raceway. The raceway should be greased before assembly in most cases because the operation of the swivel joint may only rotate 90 degrees or less. The swivel bayonet joint is designed for 360 degrees rotation put actual operation may be less than that. The threaded cap can be provided with or without a grease fitting.

In some embodiments, an optional water repelling spacer is located on the outside diameter between the inner and outer race of the swivel bayonet joint to prevent condensation or water into the lubricated ball bearing raceway and contaminating the grease. In some embodiments, this is not intended to be a seal because it is part of the safety of the raceway that could build up pressure if a leak occurred in the O-ring and the cryogenic fluid would expand at warmer temperatures and cause high pressure in the raceways if this spacer acted as a seal. The connection between the inner and outer bayonet can be allowed to vent any leaked gas from an O-ring failure. To further protect the raceways from dust or other contamination, a felt dust seal can be is located between the inner and outer raceways preventing this from occurring.

Example Application

The swivel bayonet joint may be employed in a cryogenic fluid dispensing station or system where a pump control housing protects a cryogenic fluid fixed inlet valve and fixed outlet valve for directing cryogenic fluids to a storage tank, which is typically located underground. In this configuration, the housing typically houses a control panel for controlling inlet and outlet of the fluid through the fixed inlet and outlet valves, which are protected by a housing door. A cryogenic fluid dispensing arm is secured to the housing at a housing cryogenic outlet pipe. The arm can include a swivel bayonet joint described more fully herein, interconnecting the outlet pipe and a second section of cryogenic pipe. A second bayonet joint as described herein can also secure between additional cryogenic pipes that couple a discharge outlet for dispensing cryogenic fluid into a cryogenic fluid user such as a vehicle (not shown).

Standard cryogenic pipe may be rigid or flexible and swivel bayonet joints constructed in accordance with aspects herein may be utilized in both rigid or flexible cryogenic pipes. The cryogenic fluid dispensing system may optionally include counter weight means for compensating for the weight of a fluid dispensing arm as the arm moves from a stored position to a dispensing position, such as a counter weight stack.

Another application is to connect a bayonet swivel joint to each end of a vacuum jacketed flexhose to eliminate torsion in the flexhose and allow for displacement in multiple directions without damage to the flexhose. The swivel accommodates any torsion that a flexhose is exposed to when it is bending in two directions for unique operations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A swivel bayonet joint for transferring cryogenic fluids, comprising:
    a plug bayonet joint comprising:
        an insertion stem having an insertion jacket surrounding and co-axial with a plug inner line of a corresponding pipe section; and
        a first clamp member having at least one race; and
    a socket bayonet joint comprising:
        a vacuum jacket at a distal end thereof that sleeves over the insertion stem of the plug bayonet joint; and
        a second clamp member having at least one race;
    wherein:
        when the plug bayonet joint is mated with the socket bayonet joint, the race of the first clamp member aligns with the race of the second clamp member to define a clamp having a bearing aperture;
        when ball bearings fill the bearing aperture, the ball bearings function to lock the plug bayonet joint to the socket bayonet joint so as to allow rotation therebetween; and
        the socket bayonet joint includes a rectangular or square outer surface with through holes for attaching to a fixed structure in alignment with a centerline of a hinge pin with spacers between the structure and swivel bayonet joint to align on the centerline axis of the hinge pin.

2. The swivel bayonet joint of claim 1, wherein:
the plug bayonet joint further comprises a first support strut that supports a pipe jacket co-axial with the plug inner line, such that the swivel bayonet joint restricts heat input into a cryogenic process fluid carried through the swivel bayonet joint, and maintains mechanical components of the swivel bayonet joint at ambient temperatures while the cryogenic process fluid passes through the swivel bayonet joint.

3. The swivel bayonet joint of claim 1 further comprising:
a dust seal;
wherein:
    the first clamp member comprises a recess;
    the dust seal sits in the recess; and
    the second clamp member comprises a finger that projects into an entrance of the recess, thus trapping the dust seal in the recess.

4. The swivel bayonet joint of claim 1 further comprising:
a dust seal;
wherein:
the second clamp member includes a dust seal groove with a dust seal lip;
the dust seal rests in the dust seal groove; and
the lip prevents the dust seal from falling out of the dust seal groove by slightly compressing the dust seal.

5. The swivel bayonet joint of claim 1 further comprising:
an O-ring seal;
wherein:
    the second clamp member comprises a recess radially adjacent to a concentric, planar surface of the first clamp member;
    the O-ring seal sits in the recess; and
    the first clamp member comprises a surface that blocks an entrance of the recess, thus trapping the O-ring seal in the recess.

6. The swivel bayonet joint of claim 5, wherein:
the swivel bayonet joint maintains the O-ring seal at or near ambient temperature to be within parameters of the elastomer limits of the O-ring material specified.

7. The swivel bayonet joint of claim 1, wherein:
the first clamp member is welded or attached to the inner vacuum jacketed plug bayonet.

8. The swivel bayonet joint of claim 1, wherein:
the second clamp member is welded or attached to the outer vacuum jacketed socket bayonet.

9. The swivel bayonet joint of claim 1, wherein:
the socket bayonet joint includes a mounting flange for direct mounting to a fixed structure in alignment with a hinge pin of a door or swing arm structure, wherein the first mounting block or the plug bayonet joint is attached or connected to the door or swing arm structure permitting rotating along the same pivot point as the door hinge or structure.

10. The swivel bayonet joint of claim 1, wherein:

the swivel joint bayonet is free mounting with no mounting requirements, such that the swivel joint is in a second position in a swing arm, and is supported by piping connection on either end of the swivel joint bayonet.

11. The swivel bayonet joint of claim 1, wherein:

all welding and stress relieving is completed before machining; and no welding is required after machining that could cause distortion to occur to the high tolerances of the swivel joint bayonet assembly between the plug and socket bayonet.

12. The swivel bayonet joint of claim 1, wherein:

the swivel joint bayonet has an inner and outer pipe connection at either end with a vacuum space in an annular space that reduces the heat input into the cryogenic fluid or low temperature fluids that are sensitive to atmospheric ambient temperatures.

13. The swivel bayonet joint of claim 12, wherein:

the heat input is determined by a length and wall thickness of the bayonet pipes or tubes machined to fit between the plug bayonet joint and socket bayonet joint, wherein a gap between the plug and socket bayonets causes a static vapor trap to reduce the heat transfer in the fluid from the warm end of the bayonet to the cold end of the bayonet.

14. The swivel bayonet joint of claim 1, wherein:

swivel portion of the bayonet joint comprises at least two inner and outer races with ball bearings within the races, that are lubricated with grease appropriate for the cryogenic fluid within the piping system.

15. The swivel bayonet joint of claim 14, wherein:

the swivel joint ball bearings are not exposed to the operating temperature or pressure within the piping system because they are on the other side of the O-ring seal.

16. The swivel bayonet joint of claim 1, wherein:

scaling of size of the swivel bayonet joints from small to large is achieved without distortion between the plug bayonet joint and socket bayonet joint by not welding after machining.

17. The swivel bayonet joint of claim 1, wherein:

the socket bayonet joint is provided with a threaded access port at each raceway to insert the ball bearings in the assembly after the plug swivel bayonet joint is assembled and aligned with the raceway.

18. The swivel bayonet joint of claim 1, wherein:

an access port includes a threaded cap that is aligned with the outer diameter of the bearing raceway and includes an O-ring seal to keep grease from escaping the raceway.

19. A swivel bayonet joint for transferring cryogenic fluids, comprising:

a plug bayonet joint comprising:
an insertion stem having an insertion jacket surrounding and co-axial with a plug inner line of a corresponding pipe section; and
a first clamp member having at least one race; and a socket bayonet joint comprising:
a vacuum jacket at a distal end thereof that sleeves over the insertion stem of the plug bayonet joint;
a second clamp member having at least one race; and
a dust seal;

wherein:
when the plug bayonet joint is mated with the socket bayonet joint, the race of the first clamp member aligns with the race of the second clamp member to define a clamp having a bearing aperture;
when ball bearings fill the bearing aperture, the ball bearings function to lock the plug bayonet joint to the socket bayonet joint so as to allow rotation therebetween;
the first clamp member comprises a recess;
the dust seal sits in the recess; and
the second clamp member comprises a finger that projects into an entrance of the recess, thus trapping the dust seal in the recess.

* * * * *